(12) United States Patent
Telefus

(10) Patent No.: US 9,490,651 B2
(45) Date of Patent: *Nov. 8, 2016

(54) SWEEP FREQUENCY MODE FOR MAGNETIC RESONANT POWER TRANSMISSION

(71) Applicant: Flextronics AP, LLC, Broomfield, CO (US)

(72) Inventor: Mark Telefus, Orinda, CA (US)

(73) Assignee: Flextronics AP, LLC, Broomfield, CO (US)

( * ) Notice: Subject to any disclaimer, the term of this patent is extended or adjusted under 35 U.S.C. 154(b) by 472 days.

This patent is subject to a terminal disclaimer.

(21) Appl. No.: 13/865,052

(22) Filed: Apr. 17, 2013

(65) Prior Publication Data

US 2014/0266028 A1 Sep. 18, 2014

Related U.S. Application Data

(60) Provisional application No. 61/799,124, filed on Mar. 15, 2013.

(51) Int. Cl.

| H02J 7/00 | (2006.01) |
|---|---|
| H01F 27/42 | (2006.01) |
| H04B 5/00 | (2006.01) |
| H04B 1/38 | (2015.01) |
| H02J 7/02 | (2016.01) |
| H03K 17/00 | (2006.01) |
| H02M 3/335 | (2006.01) |

(52) U.S. Cl.
CPC .......... *H02J 7/025* (2013.01); *H02M 3/33507* (2013.01); *H03K 17/00* (2013.01); *H04B 5/0037* (2013.01)

(58) Field of Classification Search
CPC .............................. H02J 7/025; H04B 5/0037

USPC .................. 320/108; 307/104; 455/41.1, 573
See application file for complete search history.

(56) References Cited

U.S. PATENT DOCUMENTS

| 5,166,620 | A | * | 11/1992 | Panosh | .......................... 324/322 |
| 5,293,308 | A | | 3/1994 | Boys | |
| 7,986,059 | B2 | * | 7/2011 | Randall | ................ H01R 25/147 307/104 |
| 8,174,233 | B2 | * | 5/2012 | Julstrom et al. | ............... 320/108 |
| 8,829,849 | B2 | * | 9/2014 | Kim | ......................... H02J 5/005 320/108 |
| 9,293,929 | B2 | * | 3/2016 | Hong | ...................... H02J 5/005 |

(Continued)

FOREIGN PATENT DOCUMENTS

WO WO2012071268 A2 5/2012

*Primary Examiner* — M'Baye Diao
(74) *Attorney, Agent, or Firm* — Haverstock & Owens LLP

(57) ABSTRACT

A power transmission pad is configured to provide wireless power transmission to a receiving device where the receiving device is orientation-free relative to the pad. The pad functions as a transmitter and is magnetically "hot", meaning the pad generates a magnetic field when powered on. The receiving device, such as a cell phone, tablet, or other portable electronic device, is placed within the magnetic field for the purpose of charging the device battery. In contrast to conventional wireless battery charging systems, there are no restrictions on the orientation of the receiving device relative to the pad. The power transmission pad includes a sweep frequency generator for generating power transmissions across a frequency spectrum. An optimal frequency is determined for maximum energy transfer to the receiving device, and the sweep frequency generator is locked to the determined optimal frequency.

21 Claims, 2 Drawing Sheets

(56) References Cited

U.S. PATENT DOCUMENTS

| | | | |
|---|---|---|---|
| 2007/0279002 A1* | 12/2007 | Partovi | 320/115 |
| 2009/0096413 A1* | 4/2009 | Partovi et al. | 320/108 |
| 2009/0174263 A1 | 7/2009 | Baarman | |
| 2010/0187913 A1 | 7/2010 | Smith | |
| 2010/0289449 A1* | 11/2010 | Elo | 320/108 |
| 2010/0308974 A1* | 12/2010 | Rowland et al. | 340/10.4 |
| 2011/0084752 A1* | 4/2011 | Julstrom et al. | 327/336 |
| 2011/0127843 A1* | 6/2011 | Karaoguz | G06K 7/10207 307/104 |
| 2012/0080957 A1* | 4/2012 | Cooper | H02J 5/005 307/104 |
| 2012/0286728 A1* | 11/2012 | Bella et al. | 320/108 |
| 2013/0002034 A1* | 1/2013 | Onizuka et al. | 307/104 |
| 2013/0051083 A1* | 2/2013 | Zhao | 363/17 |

\* cited by examiner

SWEEP FREQUENCY MODE FOR MAGNETIC RESONANT POWER TRANSMISSION

RELATED APPLICATIONS

This Patent Application claims priority under 35 U.S.C. 119(e) of the U.S. Provisional Application Ser. No. 61/799,124, filed Mar. 15, 2013, and entitled "New Power Management Integrated Circuit Partitioning With Dedicated Primary Side Control Winding". This application incorporates U.S. Provisional Application Ser. No. 61/799,124 in its entirety by reference.

FIELD OF THE INVENTION

The present invention is generally directed to the field of wireless power transmission. More specifically, the present invention is directed to using a sweep frequency mode for magnetic resonant power transmission.

BACKGROUND OF THE INVENTION

Portable electronics devices use batteries that require periodic recharging. Conventional recharging techniques include both wired and wireless approaches. In an exemplary wired recharging technique, an electrical power adapter includes an electrical cord and power converter for plugging into the portable device on one end and a power outlet, such as a wall socket, on the other end.

In an exemplary wireless recharging technique, a power supply pad is configured for wireless power transmission. The power supply pad is typically connected to wall socket via a power cord. The power supply pad includes a power transmitter for wireless power transmission to a portable electronics device having a power receiver. The power transmitter includes a communications processing block and a power transmitting element, such as a coiled wire antenna. The power transmitting element generates a magnetic field through which power is wirelessly transmitted. The magnetic field orientation is a function of the transmission frequency and the physical orientation of the power transmitting element. Conventional power supply pads transmit at a constant frequency, and since the physical orientation of the power transmitting element is also fixed, the magnetic field generated by the power transmitting element of the power supply pad has a specific fixed orientation. The portable electronic device, such as a cellular telephone, includes a communications processing block and a power receiving element, such as a coiled wire antenna. To receive power from the power supply pad, the portable electronic device must be positioned within range of the magnetic field generated by the power transmitting element of the power supply pad. For optimized energy transfer, the portable electronic device must also be properly oriented relative to the power transmission element. Due to the specific orientation of the magnetic field generated by the power transmission element, the power receiving element of the portable electronic device must be properly oriented with the magnetic field or else the wireless power transmission is not optimized or can not be completed. This requires meticulous placement of the portable electronic device on or near the power supply pad, which can be time consuming and frustrating for the end user.

In some applications, the power supply pad is fitted with a cradle, or other type of device place holder, sized to receive the portable electronic device in a specific orientation. The cradle is oriented within the power supply pad so that when the portable electronic device is positioned within the cradle, the power receiving element of the portable electronic device is properly aligned with the power transmission element, and therefore the magnetic field, of the power supply pad. However, having to place the portable electronic device within the cradle almost defeats the purpose of a wireless power transmission application designed for free placement of the device without need for a hard connection to a power source.

SUMMARY OF THE INVENTION

A power transmission pad is configured to provide wireless power transmission to a receiving device where the receiving device is orientation-free relative to the pad. The pad functions as a transmitter and is magnetically "hot", meaning the pad generates a magnetic field when powered on. The receiving device, such as a cell phone, tablet, or other portable electronic device, is placed within the magnetic field for the purpose of charging the device battery. In contrast to conventional wireless battery charging systems, there are no restrictions on the orientation of the receiving device relative to the pad. The power transmission pad includes a sweep frequency generator for generating power transmissions across a frequency spectrum. An optimal frequency is determined for maximum energy transfer to the receiving device, and the sweep frequency generator is locked to the determined optimal frequency.

In an aspect, a power transmission pad for wireless power transmission is disclosed. The power transmission pad includes a coil, a power transmitter and a controller. The power transmitter includes a sweep frequency generator coupled to the coil to provide a frequency varying signal through the coil, thereby generating a variable magnetic field. The controller is coupled to the coil and to the sweep frequency generator. When a portable electronic device to be charged is positioned within the variable magnetic field generated by the power transmission pad, the controller is configured to determine a resonant frequency corresponding to a maximum energy transfer from the power transmission pad to the portable electronic device. The resonant frequency is locked for power transmission from the power transmission pad to the portable electronic device.

In another aspect, a system for wireless power transmission is disclosed. The system includes a power transmission pad and a portable electronic device to be charged. The power transmission pad includes a first coil, a power transmitter and a controller. The power transmitter has a sweep frequency generator coupled to the first coil to provide a frequency varying signal through the coil, thereby generating a variable magnetic field. The controller is coupled to the first coil and to the sweep frequency generator. The portable electronic device includes a second coil and a power receiver. The power receiver is coupled to the second coil and is configured to receive energy transferred from the power transmission pad via the second coil. When the portable electronic device is positioned within the variable magnetic field generated by the power transmission pad, the controller is configured to determine a resonant frequency corresponding to a maximum energy transfer from the power transmission pad to the portable electronic device. The resonant frequency is locked for power transmission from the power transmission pad to the portable electronic device.

In some embodiments, the portable electronic device includes a resonant tank having the second coil, and the resonant frequency corresponding to the maximum energy transfer is a resonant frequency of the resonant tank. In some embodiments, the power receiver further includes a power management block configured to monitor a charge level of a portable electronic device battery, and configured to generate a charge level status signal. The charge level status signal can include a power transmission termination signal when the battery is fully charged. In some embodiments, the charge level status signal is transmitted to the power transmitter via the second coil and the first coil. In some embodiments, a constant power level is transmitted by the pad. In some embodiments, the portable electronic device also includes a battery charger coupled to the power receiver. In some embodiments, determining the resonant frequency includes monitoring a charge current of the portable electronic device while the sweep frequency generator sweeps the transmission frequencies across a sweep frequency spectrum, and when the charge current exceeds a threshold level for a specific frequency it is determined that the specific frequency is the resonant frequency. In some embodiments, determining the resonant frequency includes monitoring a charge current of the portable electronic device while the sweep frequency generator sweeps the transmission frequencies across a sweep frequency spectrum, and selecting a specific frequency corresponding to the highest charge current as the resonant frequency. In some embodiments, determining the resonant frequency includes monitoring an impedance on the power transmission pad while the sweep frequency generator sweeps the transmission frequencies across a sweep frequency spectrum, wherein a change in the impedance corresponds to an energy transfer to the portable electronic device, and when the change in impedance exceeds a threshold level for a specific frequency it is determined that the specific frequency is the resonant frequency. In some embodiments, determining the resonant frequency includes monitoring an impedance on the power transmission pad while the sweep frequency generator sweeps the transmission frequencies across a sweep frequency spectrum, wherein a change in the impedance corresponds to an energy transfer to the portable electronic device, and selecting a specific frequency corresponding to a greatest change in impedance as the resonant frequency.

In yet another aspect, a method of wireless power transmission between a power transmission pad and a portable electronic device to be charged is disclosed. The method includes configuring the power transmission pad with a first coil and a sweep frequency generator, and the portable electronic device with a second coil. The method also includes generating a variable magnetic field by applying the sweep frequency generator to the first coil and measuring a system characteristic in response to the variable magnetic field. The method also includes determining a resonant frequency of the portable electronic device according to the measured system characteristic. The method also includes locking an energy transmission frequency of the power transmission pad to the resonant frequency and transmitting power from the power transmission pad to the portable electronic device using the locked energy transmission frequency.

In some embodiments, the system characteristic is a charge current of the portable electronic device and determining the resonant frequency includes monitoring the charge current of the portable electronic device while the sweep frequency generator sweeps the transmission frequencies across a sweep frequency spectrum, and when the charge current exceeds a threshold level for a specific frequency it is determined that the specific frequency is the resonant frequency. In some embodiments, the system characteristic is a charge current of the portable electronic device and determining the resonant frequency includes monitoring the charge current of the portable electronic device while the sweep frequency generator sweeps the transmission frequencies across a sweep frequency spectrum, and selecting a specific frequency corresponding to the highest charge current as the resonant frequency. In some embodiments, the system characteristic is an impedance on the power transmission pad and determining the resonant frequency includes monitoring the impedance on the power transmission pad while the sweep frequency generator sweeps the transmission frequencies across a sweep frequency spectrum, wherein a change in the impedance corresponds to an energy transfer to the portable electronic device, and when the change in impedance exceeds a threshold level for a specific frequency it is determined that the specific frequency is the resonant frequency. In some embodiments, the system characteristic is an impedance on the power transmission pad and determining the resonant frequency includes monitoring the impedance on the power transmission pad while the sweep frequency generator sweeps the transmission frequencies across a sweep frequency spectrum, wherein a change in the impedance corresponds to an energy transfer to the portable electronic device, and selecting a specific frequency corresponding to a greatest change in impedance as the resonant frequency. In some embodiments, the portable electronic device includes a resonant tank having the second coil, and the determined resonant frequency corresponds to a resonant frequency of the resonant tank. In some embodiments, the method also includes monitoring a charge level of a portable electronic device battery, and generating a charge level status signal. In some embodiments, the charge level status signal is a power transmission termination signal when the battery is fully charged. In some embodiments, the method also includes transmitting the charge level status signal from the portable electronic device to the power transmission pad.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Embodiments of the present application are directed to a method and system for wireless power transmission. Those of ordinary skill in the art will realize that the following detailed description of the method and system is illustrative only and is not intended to be in any way limiting. Other embodiments of the method and system will readily suggest themselves to such skilled persons having the benefit of this disclosure.

Reference will now be made in detail to implementations of the method and system as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
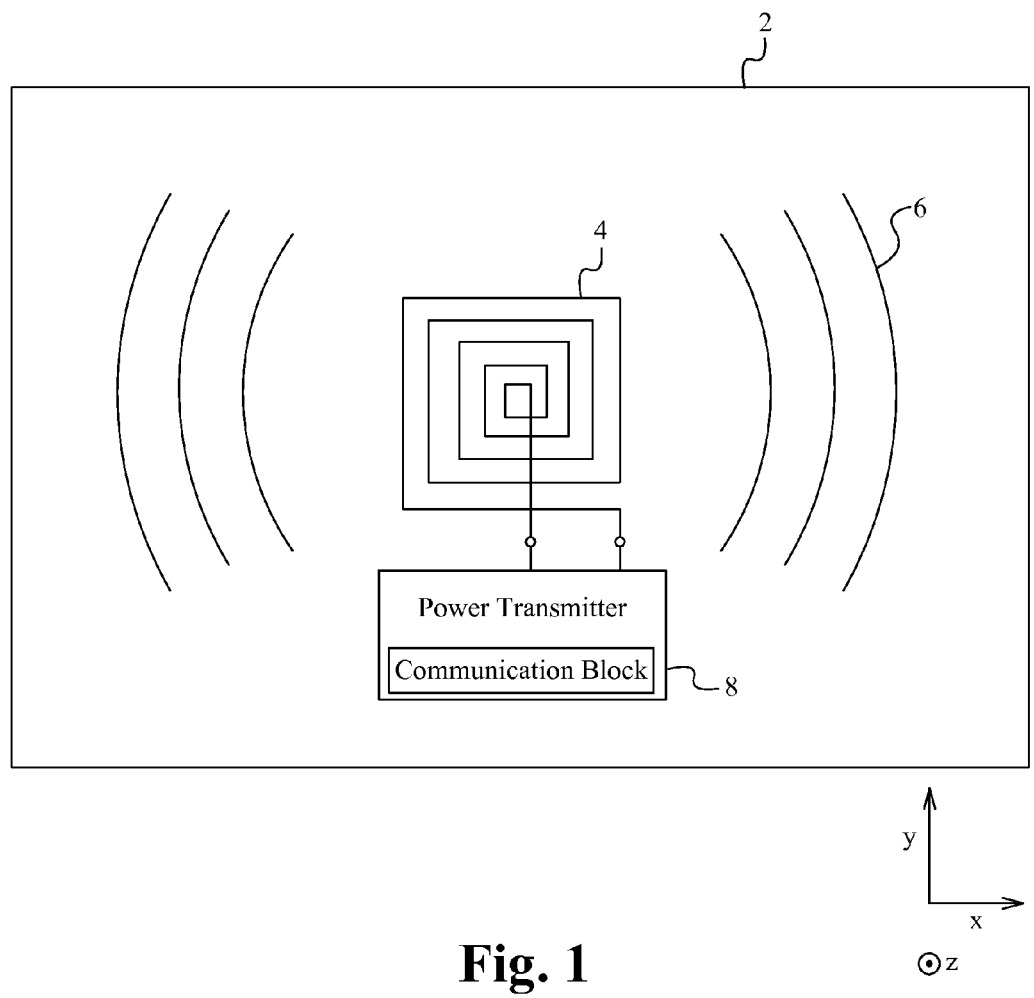
FIG. 1 illustrates a power transmission pad according to an embodiment.

FIG. 1 illustrates a power transmission pad according to an embodiment. The pad 2 includes a coil 4 coupled to a power transmitter 8. The power transmitter 8 is configured to provide frequency varying driving signals to the coil 4 thereby generating a variable magnetic field. The magnetic field strength diminishes with distance from the coil 4. The magnetic field is used to provide wireless energy transfer to a device placed within an effective area of the magnetic field. The effective area of the magnetic field is that area where the magnetic field strength is above a minimum level for effective energy transfer. In some embodiments, the effective area corresponds to an area of the pad. In some embodiments, the effective area extends beyond a perimeter of the pad. In most applications, the effective area is limited to a proximate area around the pad so as not to adversely effect other nearby electronic devices. The power transmitter 8 is also configured for bi-directional communications with an external device when properly magnetically coupled to the pad. The bi-directional communications include an energy transfer transmission from the pad to the device, and communication signaling from the device to the pad.

Although FIG. 1 shows the pad 4 and its corresponding magnetic field 6 in two-dimensions, the x-y plane, it is understood that the actual magnetic field extends in three-dimensions including the z-direction perpendicular to the plane of FIG. 1. The thickness of the pad 2 corresponds to the z-direction. In most configurations, the coil 4 for the pad 2 is within the pad 2, and the receiving device 20 (FIG. 3) including its corresponding coil 22 (FIG. 3) sits on top of the pad 2, thereby forming a three-dimensional orientation between the coil 2 and the coil 22.

Figure 2:
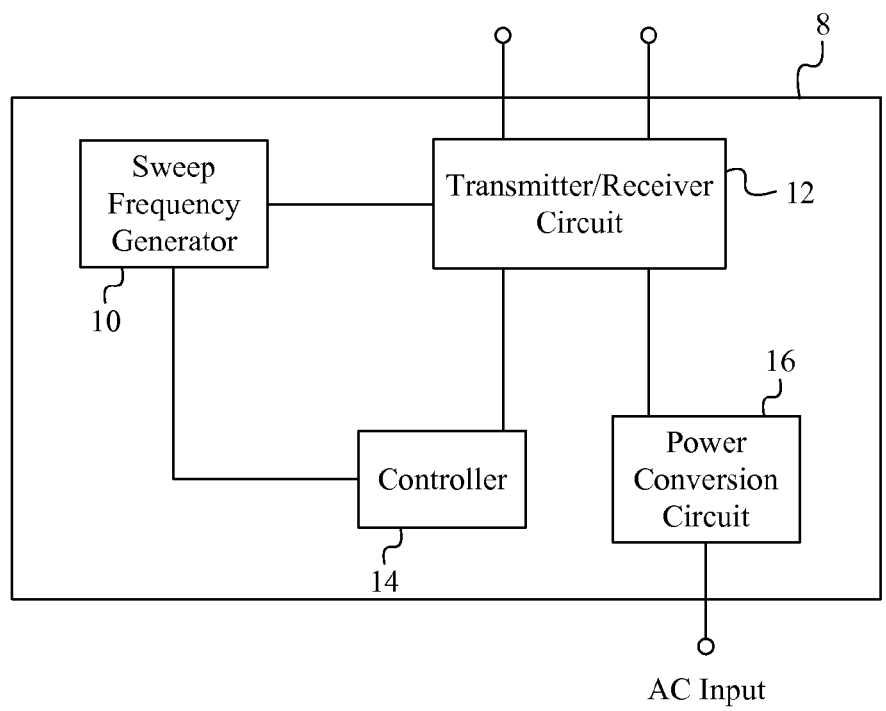
FIG. 2 illustrates a functional block diagram of the power transmitter 8 of FIG. 1 according to an embodiment.

FIG. 2 illustrates a functional block diagram of the power transmitter 8 of FIG. 1 according to an embodiment. The power transmitter 8 includes a sweep frequency generator 10, a transmitter/receiver circuit 12, a controller 14, and a power conversion circuit 16. In some embodiments, the sweep frequency generator is a wide range sweep frequency pulse power generator that generates pulsed driving signals at varying frequencies across a frequency spectrum. The transmitter/receiver circuit 12 applies the pulsed driving signals to the coil 4 thereby generating a variable magnetic field that varies according to the changing frequencies of the pulsed driving signals. The power conversion circuit 16 converts a received input power to a desired power transmission level, which is preferably a fixed value, for example 5W. In some embodiments, the pad 8 receives power by plugging into an AC outlet. The controller 14 provides control of the power transmitter 8 such that a resonant frequency is determined and locked in for maximum power transfer to the receiving device 20 (FIG. 3).

Figure 3:
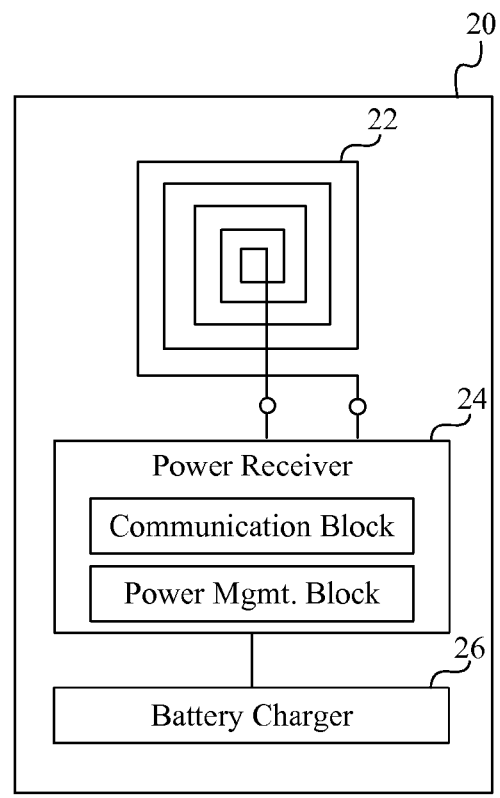
FIG. 3 illustrates a functional block diagram of a receiving device 20 according to an embodiment.

FIG. 3 illustrates a functional block diagram of a receiving device 20 according to an embodiment. In some embodi-
ments, the receiving device 20 is a portable electronic device, for example a cellular telephone, a tablet, a laptop, or other electronic device periodically requiring battery charging. The receiving device 20 includes a coil 22, a power receiver 24, and a battery charger 26. In some embodiments, the coil 22 is the antenna element that is standard with most portable electronic devices. In other embodiments, the coil 22 is a separate element from the receiving device antenna. When the receiver device 20 is positioned within the effective area of the variable magnetic field 6 of the pad 2, the coil 4 and the coil 22 form a pseudo-transformer. When power is transferred from the pad 2 to the receiving device 20, the power receiver 24 receives the power transmission via the coil 22 and delivers power to the battery charger 26. The battery charger 26 can be any type of conventional battery charger.

The receiving device 20 is configured to establish a resonant tank magnetically coupled to the pad 2, and the resonant tank is configured to drive power to the battery charger 26 according to a fixed resonant frequency. The resonant tank is formed from the coil 22 and components within the power receiver 24. When the receiver device 20 is positioned within the effective area of the variable magnetic field 6 of the pad 2, the power transmitter 8 determines when a frequency of the variable magnetic field 6 matches resonance of the receiver device resonant tank. This matching frequency is referred to as the resonant frequency. The driving signal supplied to the coil 4 is locked at the resonant frequency and power is transmitted from the pad 2 to the receiving device 20.

Although reference is made to a resonant frequency, it is understood that such a frequency can represent any frequency that induces some degree of resonance in the pad-device system, and as such can be considered a quasi-resonant frequency. In general, a frequency is determined that corresponds to a maximum energy transfer for the given orientation of the receiving device 20 relative to the pad 2, and this frequency is referred to as the resonant frequency.

In some embodiments, the resonant frequency is determined by determining an amount of energy transfer for each frequency, or select frequencies, in the frequency spectrum used by the sweep frequency generator. On the pad side, this can be accomplished by monitoring a pad impedance, or some impedance on the pad, and looking for changes in this impedance. A change in the impedance signifies an energy transfer to the receiving device. The frequency having the greatest change in impedance is used as the resonant frequency. Similarly, an S-parameter (scattering parameter) corresponding to the pad can be determined for each frequency and the change in S-parameter can be used to determine the resonant frequency. The S-parameter is known to vary with frequency, and as such each frequency is associated with a frequency-specific baseline S-parameter, which is compared to the monitored S-parameter for that specific frequency.

On the receiving device side, the power receiver 24 can include a power management block coupled to the receiving device battery to monitor both the battery charge level and the rate of current charge for charging the battery. The rate of current charge will vary with changing frequency of the power transmission. The rate of current charge is compared to a threshold value, and if the rate of current charge exceeds the threshold value, then the frequency corresponding to the rate of current change that exceeds the threshold value is considered to be the resonant frequency. Alternatively, the rate of current charge is measured for each frequency, or select frequencies, and the frequency having the largest corresponding rate of current charge is considered to be the resonant frequency. It is understood that alternative means can be used, on either the pad side, the receiving device side, or both to determine the frequency corresponding to the greatest amount of energy transfer to the receiving device.

In some embodiments, the power management block in the power receiver 24 is configured to transmit a communication signal through the coil 22 to the magnetically coupled coil 4 on the pad 2. The transmitter/receiver circuit 12 and the controller 14 are configured to receive and interpret the communication signal. The communication signal includes control information, such as information for identifying the frequency corresponding to the maximum energy transfer. As such, the communication signal can be used to provide information for selecting the resonant frequency. In some embodiments, the communication signal is a simple binary signal, such as an indication that the rate of current charge has exceeded the threshold value. In other embodiments, the communication signal includes more detailed information, such as the rate of current charge at certain intervals, which can be matched to individual frequencies. The communication signal can also include control information related to a battery charge status. In some embodiments, the communication signal is a simple binary signal, such as an indication that the battery charge level is either full or not full. When the communication signal indicates the receiving device battery is full, the power transmission is terminated. In other embodiments, the communication signal includes more detailed information including, but not limited to, the amount that the receiving device battery is currently charged, for example 75% charged. The communication signal can be provided using any conventional means for transmitting a signal over magnetically coupled coils. An exemplary means for providing the communication signal is found in the co-owned, co-pending U.S. patent application Ser. No. 13/865,022, which is hereby incorporated in its entirety by reference.

By using a sweep frequency generator and determining the optimum frequency for maximum energy transfer, the power transmission pad functions as a universal charger. The pad is not limited to specifically configured receiving devices. Each receiving device has a certain Q factor. The Q factor is dependent on many conditions including, but not limited to, the transmission frequency, the antenna configuration, and the constituent components of the resonant tank. As a universal charger, it does not matter the size and shape of the antenna coil, the number and type of resonant elements in the resonant tank or the power transmission frequency. The power transmission pad is adaptive to determine the optimal resonance frequency for maximum power transfer regardless of receiving device type or position orientation relative to the pad.

The present application has been described in terms of specific embodiments incorporating details to facilitate the understanding of the principles of construction and operation of the method and system. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A power transmission pad for wireless power transmission comprising:
   a. a coil;
   b. a power transmitter having a sweep frequency generator coupled to the coil to provide a frequency varying signal through the coil, thereby generating a variable magnetic field; and
   c. a controller coupled to the coil and to the sweep frequency generator, wherein when a portable electronic device to be charged is positioned within the variable magnetic field generated by the power transmission pad, the controller is configured to determine a resonant frequency corresponding to a maximum energy transfer from the power transmission pad to the portable electronic device, and the resonant frequency is locked for power transmission from the power transmission pad to the portable electronic device, wherein the resonant frequency is determined by sweeping transmission frequencies of the frequency varying signal across a sweep frequency spectrum, monitoring a characteristic of the pad or of the portable electronic device in response to the variable magnetic field, and selecting a specific frequency according to the monitored characteristic.

2. A system for wireless power transmission comprising:
   a. a power transmission pad comprising:
      i. a first coil;
      ii. a power transmitter having a sweep frequency generator coupled to the first coil to provide a frequency varying signal through the first coil, thereby generating a variable magnetic field, wherein the sweep frequency generator is configured to sweep transmission frequencies of the frequency varying signal across a sweep frequency spectrum; and
      iii. a controller coupled to the first coil and to the sweep frequency generator;
   b. a portable electronic device to be charged comprising:
      i. a second coil; and
      ii. a power receiver coupled to the second coil and configured to receive energy transferred from the power transmission pad via the second coil,
   wherein when the portable electronic device is positioned within the variable magnetic field generated by the power transmission pad, the controller is configured to determine a resonant frequency corresponding to a maximum energy transfer from the power transmission pad to the portable electronic device, and the resonant frequency is locked for power transmission from the power transmission pad to the portable electronic device.

3. The system of claim 2 wherein the portable electronic device includes a resonant tank comprising the second coil, and the resonant frequency corresponding to the maximum energy transfer comprises a resonant frequency of the resonant tank.

4. The system of claim 2 wherein the power receiver further comprises a power management block configured to monitor a charge level of a portable electronic device battery, and configured to generate a charge level status signal.

5. The system of claim 4 wherein the charge level status signal comprises a power transmission termination signal when the battery is fully charged.

6. The system of claim 4 wherein the charge level status signal is transmitted to the power transmitter via the second coil and the first coil.

7. The system of claim 2 wherein a constant power level is transmitted by the pad.

8. The system of claim 2 wherein the portable electronic device further comprises a battery charger coupled to the power receiver.

9. The system of claim 2 wherein determining the resonant frequency comprises monitoring a charge current of the portable electronic device while the sweep frequency generator sweeps the transmission frequencies across a sweep frequency spectrum, and when the charge current exceeds a threshold level for a specific frequency it is determined that the specific frequency is the resonant frequency.

10. The system of claim 2 wherein determining the resonant frequency comprises monitoring a charge current of the portable electronic device while the sweep frequency generator sweeps the transmission frequencies across a sweep frequency spectrum, and selecting a specific frequency corresponding to the highest charge current as the resonant frequency.

11. The system of claim 2 wherein determining the resonant frequency comprises monitoring an impedance on the power transmission pad while the sweep frequency generator sweeps the transmission frequencies across a sweep frequency spectrum, wherein a change in the impedance corresponds to an energy transfer to the portable electronic device, and when the change in impedance exceeds a threshold level for a specific frequency it is determined that the specific frequency is the resonant frequency.

12. The system of claim 2 wherein determining the resonant frequency comprises monitoring an impedance on the power transmission pad while the sweep frequency generator sweeps the transmission frequencies across a sweep frequency spectrum, wherein a change in the impedance corresponds to an energy transfer to the portable electronic device, and selecting a specific frequency corresponding to a greatest change in impedance as the resonant frequency.

13. A method of wireless power transmission between a power transmission pad and a portable electronic device to be charged, the method comprising:
  a. configuring the power transmission pad with a first coil and a sweep frequency generator, and the portable electronic device with a second coil;
  b. generating a variable magnetic field by applying to the first coil a frequency varying signal from the sweep frequency generator and sweeping transmission frequencies of the frequency varying signal across a sweep frequency spectrum;
  c. measuring a system characteristic of a system comprising the power transmission pad and the portable electronic device in response to the variable magnetic field;
  d. determining a resonant frequency of the portable electronic device according to the measured system characteristic;
  e. locking an energy transmission frequency of the power transmission pad to the resonant frequency; and
  f. transmitting power from the power transmission pad to the portable electronic device using the locked energy transmission frequency.

14. The method of claim 13 wherein the system characteristic comprises a charge current of the portable electronic device and determining the resonant frequency comprises monitoring the charge current of the portable electronic device while the sweep frequency generator sweeps the transmission frequencies across a sweep frequency spectrum, and when the charge current exceeds a threshold level for a specific frequency it is determined that the specific frequency is the resonant frequency.

15. The method of claim 13 wherein the system characteristic comprises a charge current of the portable electronic device and determining the resonant frequency comprises monitoring the charge current of the portable electronic device while the sweep frequency generator sweeps the transmission frequencies across a sweep frequency spectrum, and selecting a specific frequency corresponding to the highest charge current as the resonant frequency.

16. The method of claim 13 wherein the system characteristic comprises an impedance on the power transmission pad and determining the resonant frequency comprises monitoring the impedance on the power transmission pad while the sweep frequency generator sweeps the transmission frequencies across a sweep frequency spectrum, wherein a change in the impedance corresponds to an energy transfer to the portable electronic device, and when the change in impedance exceeds a threshold level for a specific frequency it is determined that the specific frequency is the resonant frequency.

17. The method of claim 13 wherein the system characteristic comprises an impedance on the power transmission pad and determining the resonant frequency comprises monitoring the impedance on the power transmission pad while the sweep frequency generator sweeps the transmission frequencies across a sweep frequency spectrum, wherein a change in the impedance corresponds to an energy transfer to the portable electronic device, and selecting a specific frequency corresponding to a greatest change in impedance as the resonant frequency.

18. The method of claim 13 wherein the portable electronic device includes a resonant tank comprising the second coil, and the determined resonant frequency corresponds to a resonant frequency of the resonant tank.

19. The method of claim 13 further comprising monitoring a charge level of a portable electronic device battery, and generating a charge level status signal.

20. The method of claim 19 wherein the charge level status signal comprises a power transmission termination signal when the battery is fully charged.

21. The method of claim 19 further comprising transmitting the charge level status signal from the portable electronic device to the power transmission pad.

* * * * *